(12) United States Patent
Abdelhadi et al.

(10) Patent No.: US 6,880,151 B2
(45) Date of Patent: Apr. 12, 2005

(54) APPARATUS AND METHOD OF PROVIDING COMMON DISTRIBUTED SERVICES FOR SYSTEM MANAGEMENT APPLICATIONS ACROSS HETEROGENEOUS ENVIRONMENTS

(75) Inventors: Sanaa F. Abdelhadi, Austin, TX (US); Sandip A. Amin, Austin, TX (US); Kwan Yin Cheung, Wappingers Falls, NY (US); David Glenn Grost, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/964,998

(22) Filed: Sep. 27, 2001

(65) Prior Publication Data

US 2003/0061327 A1 Mar. 27, 2003

(51) Int. Cl.[7] ............................................... G06F 9/445
(52) U.S. Cl. ........................................................ 717/136
(58) Field of Search ................................ 717/136–161, 717/127

(56) References Cited

U.S. PATENT DOCUMENTS 5,881,289 A * 3/1999 Duggan et al. ............. 717/145
5,903,760 A * 5/1999 Farber et al. ............... 717/146
6,496,865 B1 * 12/2002 Sumsion et al. ............ 709/229
6,687,762 B1 * 2/2004 Van Gaasbeck et al. .... 719/319

OTHER PUBLICATIONS

Bouillon et al. Retargeting Web Pages to other Computing Platforms with VAQUITA. IEEE. 2002.*

Ravindran. Engineering Dynamic Real–Time Distributed Systems: Architecture, System Description Language, and Middleware. IEEE. 2002. pp. 30–57.*

* cited by examiner

Primary Examiner—Wei Y. Zhen
(74) Attorney, Agent, or Firm—Volel Emile; Mark E. McBurney

(57) ABSTRACT

An apparatus, method, system and computer program product for allowing a command to be entered once and be translated into different command structures and be executed by computer systems running under different operating systems and having different command structures are provided. The command is entered into a common interface. The common interface translates the command into the different command structures and dispatches the command to the computer systems for execution. The common interface also requests that command execution progress status be provided by the computer systems.

20 Claims, 12 Drawing Sheets

| COMPUTER SYSTEM | SOFTWARE MANAGEMENT UTILITIES | NETWORK ADDRESSES |
|---|---|---|
| SYSTEM 1 SYSTEM 3 SYSTEM 6 | TIVOLI | 1 2 3 |
| SYSTEM 2 SYSTEM 4 | SUN | 4 5 |
| SYSTEM 5 | HOMEGROWN | 6 |

APPARATUS AND METHOD OF PROVIDING COMMON DISTRIBUTED SERVICES FOR SYSTEM MANAGEMENT APPLICATIONS ACROSS HETEROGENEOUS ENVIRONMENTS

CROSS-REFERENCE TO RELATED APPLICATIONS

This application is related to co-pending U.S. patent application Ser. No. 09/964,999 entitled APPARATUS AND METHOD OF ASCERTAINING SYSTEMS OPERABILITY BEFORE RUNNING REMOTE COMMANDS by the inventors herein filed on even date herewith and assigned to the common assignee of this application.

This application is related to co-pending U.S. patent application Ser. No. 09/965,001 entitled APPARATUS AND METHOD OF PROVIDING A PLUGGABLE USER INTERFACE by the inventors herein filed on even date herewith and assigned to the common assignee of this application.

This application is also related to co-pending U.S. patent application Ser. No. 09/965,002 entitled APPARATUS AND METHOD OF REPRESENTING REAL-TIME DISTRIBUTED COMMAND EXECUTION ACROSS DISTRIBUTED SYSTEMS by the inventors herein, filed on even date herewith and assigned to the common assignee of this application.

BACKGROUND OF THE INVENTION

1. Technical Field

The present invention is directed to a system management software utility. More specifically, the present invention is directed to an apparatus and method of executing a command only once across a heterogeneous environment.

2. Description of Related Art

In today's environment a network may consist of different computer systems running under different operating systems and using different software management utilities. The network is usually managed by a system administrator. A system administrator is an individual that is responsible for maintaining a computer system or a network of systems. The system administrator typically adds and configures new computer systems, sets up user accounts, installs system-wide software, allocates mass storage space etc. In short, the system administrator ensures that the network is operational and is running at its optimum.

To perform this task, the system administrator periodically runs tests and executes management commands on the various systems in the network. When doing so, the system manager has to access each management software utility and run as many commands as there are system management utilities in use in the network.

Thus, what is needed is a method and apparatus that allow one system management command to run on the different computers in the network.

SUMMARY OF THE INVENTION

The present invention provides an apparatus, method, system and computer program product for allowing a command to be entered once and be translated into different command structures and be executed by computer systems running under different operating systems and having different command structures. The command is entered into a common interface. The common interface translates the command into the different command structures and dispatches the command to the computer systems for execution. The common interface also requests that command execution progress status be provided by the computer systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
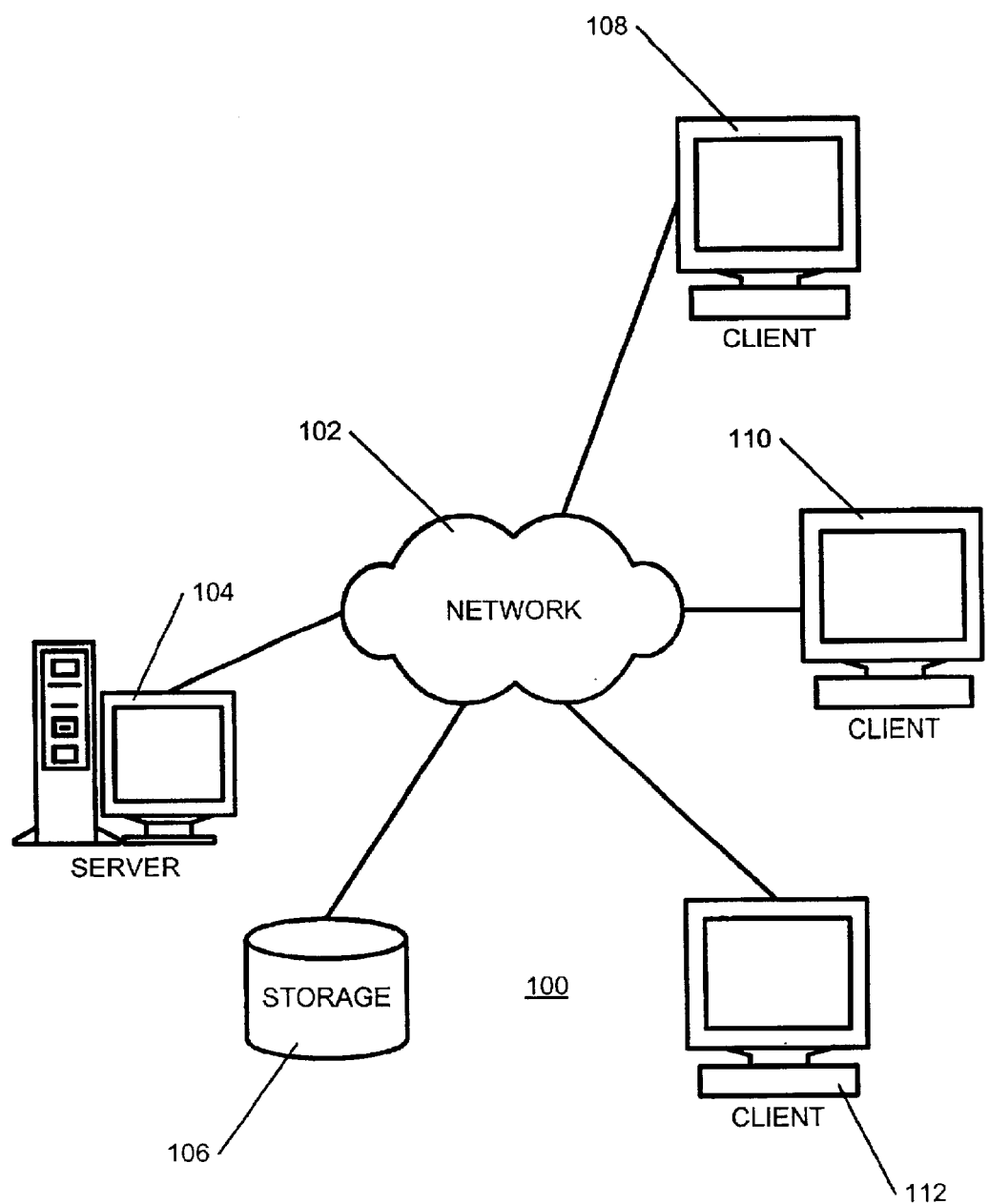
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 109, 110, and 112 are clients to server 104. Network data processing system 100 may include additional servers, clients, and other devices not shown. In the depicted example, network data processing system 100 is interconnected via the Internet and represents a collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). Additionally, clients 108, 110 and 112 may be a group or cluster of computers and each cluster may be running under a different operating system (O/S) and having different system management software utilities. Thus, FIG. 1 is intended as an example, and not as an architectural limitation for the present invention.

Figure 2:
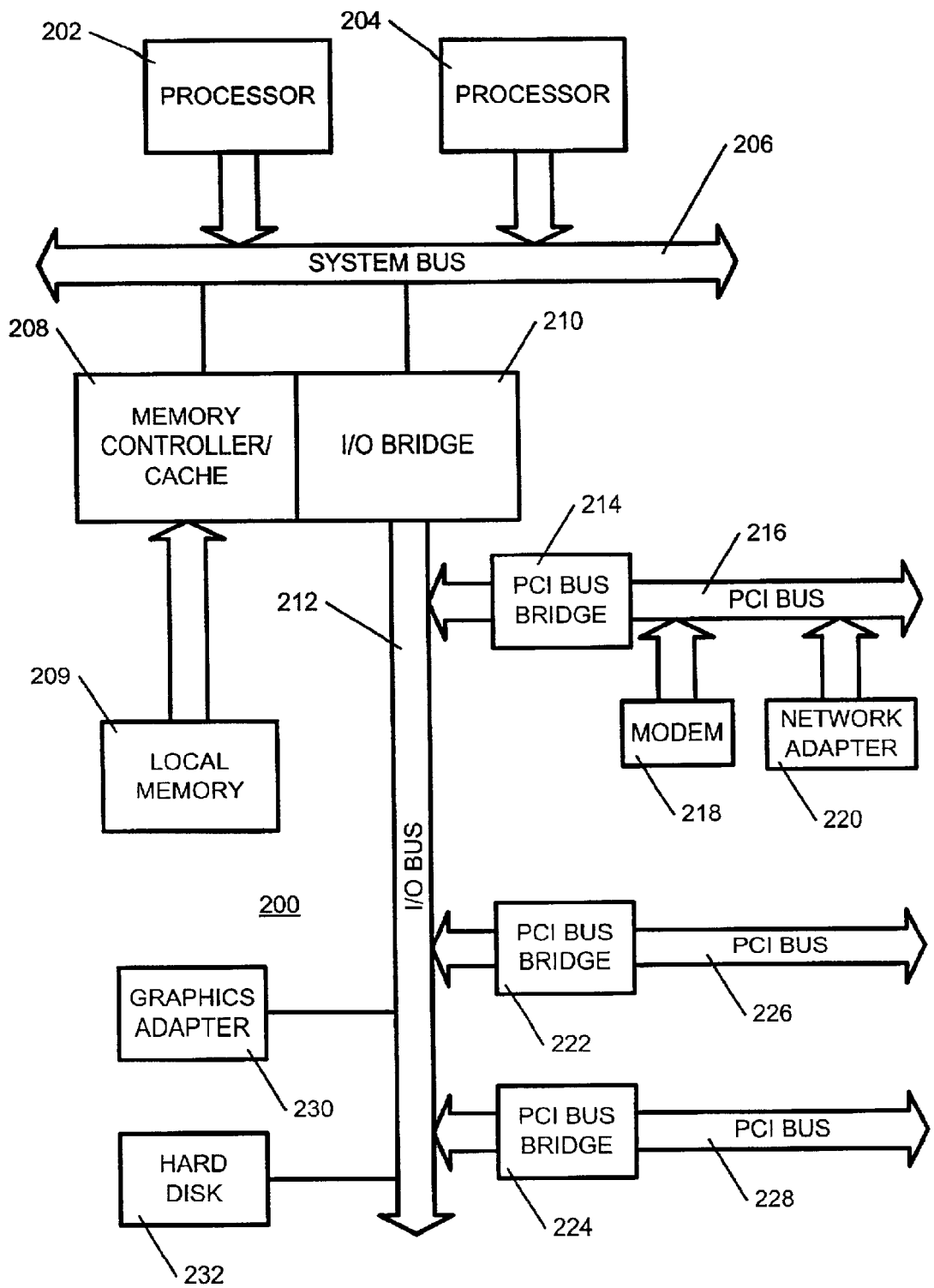
FIG. 2 is an exemplary block diagram of a server apparatus according to the present invention.

Referring to FIG. 2, a block diagram of a data processing system that may be implemented as a server, such as server 104 or any one of clients 108, 110 and 112 shown in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
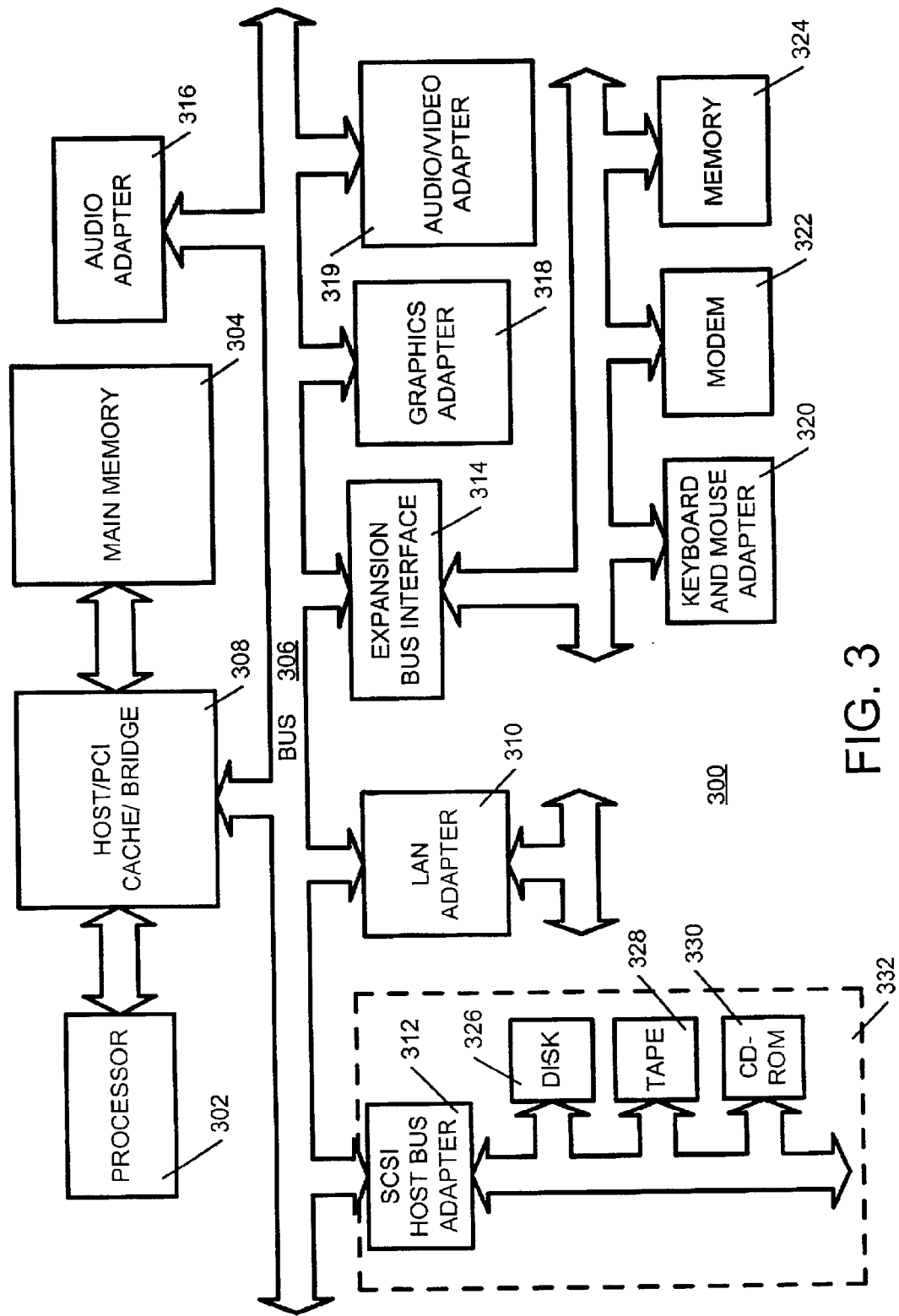
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention is a software utility that may reside on a data storage medium such as a floppy disk, compact disk (CD), hard disk etc. of one or all the client systems and servers (i.e., all the computer systems) of the network. The present software utility is a web-based utility (i.e., uses the HTML protocol) and is used to send out distributed commands to any, a few or all the computer systems in the network. Note that, although the software utility of the present invention uses the HTML protocol, it should be understood that any other protocol or combination thereof can be used and would therefore be well within the scope and spirit of the invention.

Software Engine

Figures 4, 5:
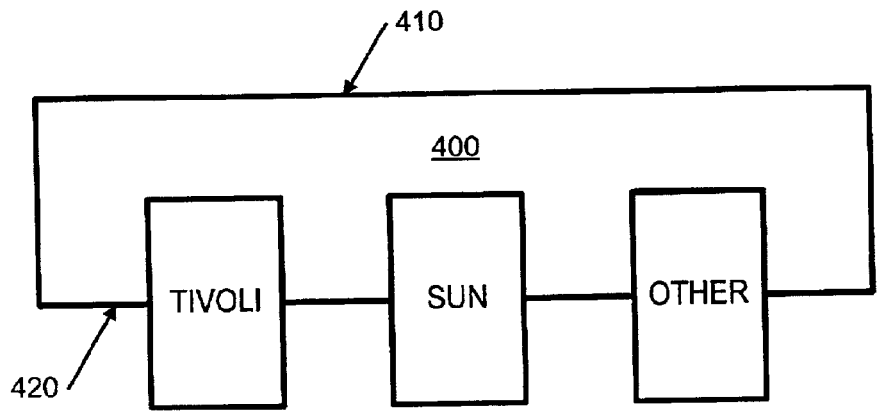
FIG. 4 is a conceptual view of a software engine used in the present invention.
FIG. 5 depicts a table within which three lists are cross-referenced to each other.

At the heart of the invention is a software engine that interfaces or glues different software management utilities to a common interface. FIG. 4 is a conceptual view of a software engine 400 used in the present invention. The software engine 400 interfaces on one side (side 410) with a common interface, described below, and on the other side (side 420) with the various software management utilities used in the network.

In the present example, a Tivoli, Sun Microsystem and "other" software management utilities are shown. The other software management utility may be an existing or future software management utility. Indeed, the software engine 400 may be provided with a set of interface specifications allowing existing or future software management utilities to be plugged into the common interface. That is, so long as interface specifications of a software management utility are provided, a system administrator or programmer may interface or glue the software management utility to the common interface. Consequently, although three software management utilities are displayed, the software engine may accommodate as many software management utilities as are used in a network, including homegrown utilities.

The software engine 400, in essence, translates communications between the common interface and the various software management utilities. Thus, the software engine 400 uses a translation table (not shown) to map commands from the common interface into the various utilities. Using a translation table to translate communications between two software devices is well known in the field and is thus not explained. The software engine 400 also contains a list of all the computer systems in the network and their locations, network identifications (IDs) or network addresses as well as a list of all the software management utilities in use in the network. These lists are cross-referenced with each other. FIG. 5 depicts a table with such cross-referenced lists.

Data, such as computer system, software management utility and network address, is entered into the cross-referencing table each time a computer system is added to the network. Conversely, data may be taken out from the table when a computer system is no longer a part of the network. The data can be entered manually or automatically. For example, a system administrator may enter into the table or take out from the table the proper information each time a computer system is added or taken out of the network, respectively. Alternatively, each time a new computer system in the network requests a network address, it can be asked to provide information regarding the software management utility it is using. This information as well as the name of the computer and its network address may then be entered automatically into the table.

The software engine 400 may be configured to periodically ping the computer systems to check for network connectivity or system operability. To ping (short for Packet INternet Groper) is to send a packet to a target system and wait for a reply. If a reply is not forthcoming, then the target system may not be connected or may not be up and running or may have a problem. If a computer fails to respond, its network connectivity status may be investigated.

Common Interface Dialog Window

Figure 6:
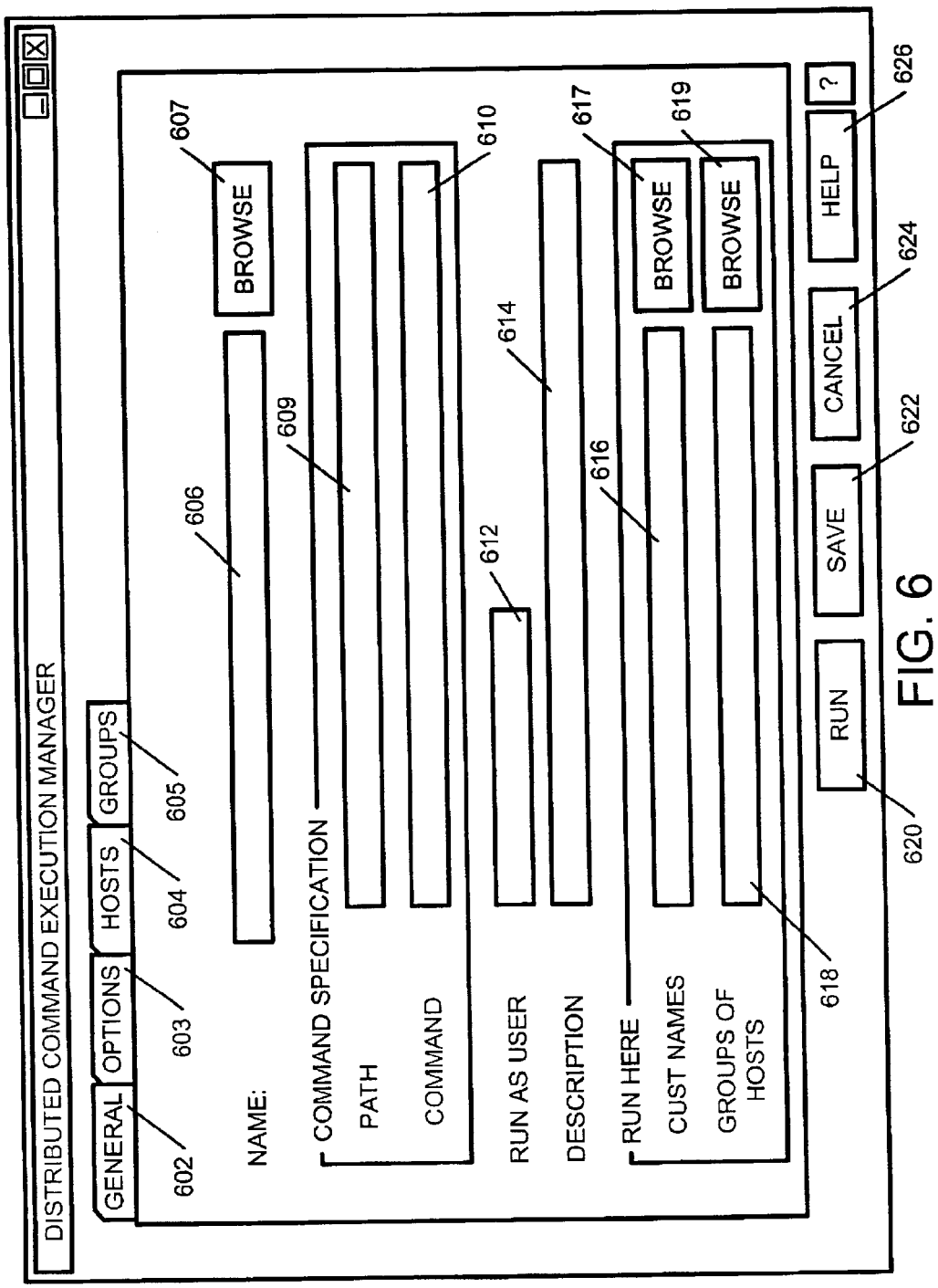
FIG. 6 illustrates a first dialog window of a common interface.

As stated above, the software engine 400 interfaces with the common interface. FIG. 6 illustrates a first dialog window of the common interface. In FIG. 6 are shown general tab 602, options tab 603, hosts tab 604 and groups tab 605. These tabs allow a user to navigate among different dialog windows of the common interface and are therefore common to all the dialog windows. Also common to all the dialog windows of the common interface are run button 620, save button 622, cancel button 624 and help button 626. The functions of these buttons will be described later.

The dialog window of the general tab 602 is the default window of the common interface. That is, when the invention is activated, FIG. 6 is displayed. This dialog window is intended to prompt for all necessary information needed to issue a command to the network. For example, the name of the command should be entered in box 606. Browse button 607 is used to display all existing commands. A user may therefore enter the name of a command manually (i.e., by typing the name in the box) or automatically (i.e., by double-clicking on the name of a command in the displayed list of commands). The directory where the command is stored should be entered in path box 609 and the command itself (i.e., script to be run) in command box 610. Box 610 may be maximized to allow the user to scrutinize the script. The identity of the user executing the command is to be entered in box 612 and a brief description of the command in box 614.

When a user enters the name of an existing command in box 606, the directory where the command is stored, the command script and the brief description of the command will all be entered automatically in boxes 609, 610 and 614, respectively, as soon as the cursor leaves command box 606. Note that, whether a command is executed depends on the identity of the user. For example, a user such as a system administrator may be able to run all commands whereas other users may only be able to run commands for which they have authorization. Authorization may be given by the system administrator.

The computer system or systems on which a command is to be executed should be entered in host names box 616. Browse button 617 may be used to display a list of all existing computer systems in the network. This list can be taken from the table in FIG. 5.

The computer systems on which a command is to be executed may be organized in groups. The dialog window of groups tab 604, which will be described later, allows for the grouping of the computer systems. Entering a group or groups of computer systems in groups hosts box 618 is an alternative method of specifying on which computers the command is to be executed. Browse button 619 allows a user to choose from among existing groups of hosts. As with all the other browse buttons, names of existing groups of hosts may be entered automatically by double-clicking on particular names from the displayed list.

Figure 7:
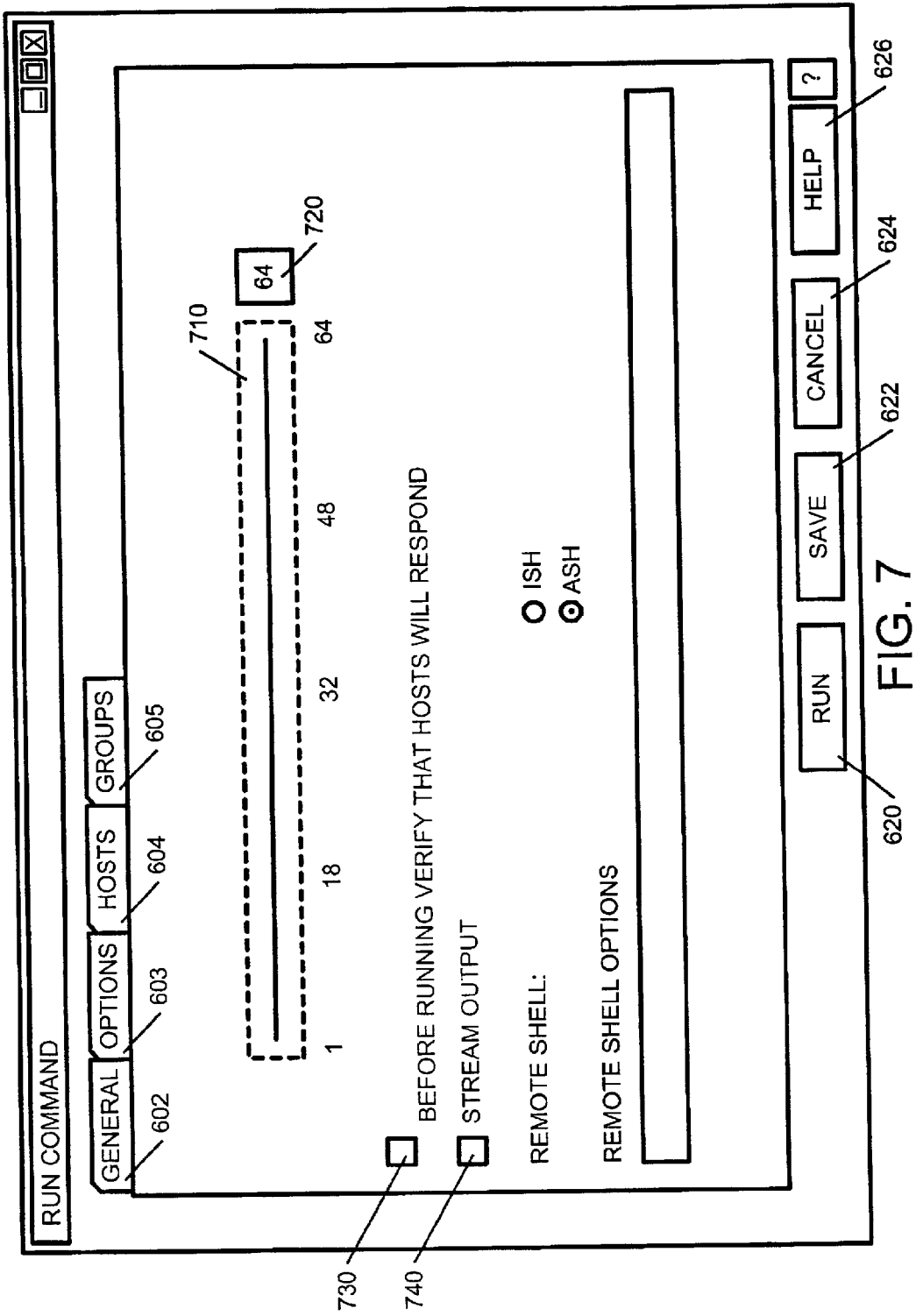
FIG. 7 illustrates a second dialog window of the common interface.

When options tab 603 is selected, the dialog window shown in FIG. 7 is displayed. In FIG. 7, a user may select the number of computer systems on which the command is to be concurrently executed. The user may select the number of computer systems by using slider 710 or by entering the number in box 720. In this particular example, up to 64 computer systems may be selected. If a number greater than 64 is entered in box 720, an error message may be generated. The error message may be a warning that the number has to be between 1 and 64, inclusively. Note that although in this particular example the number of computer systems on which a command is to be concurrently executed is restricted to 64, it is obvious that the present invention may be designed to use an infinite number. Thus, numbers greater than 64 are perfectly within the scope of the invention.

The user may choose to have the invention ascertain that the computer systems are up and operating before the execution of the command by checking box 730. When box 730 is checked, the invention pings the computer systems on which the command is to be executed. Any computer systems that do not respond to the ping may be taken off the list to reduce the number of execution errors.

The user may also select whether the output of the execution is to be streamed or provided all at once by checking box 740. If this box is not checked, the result of the execution of the command will be displayed after it (the execution) has completed. In addition, the user may choose among a plurality of security shells to use. Security shells provided are the remote shell (RSH) and the secure shell (SSH). However, any other security shells or measures may be used and would therefore be within the scope of the invention.

Figure 8:
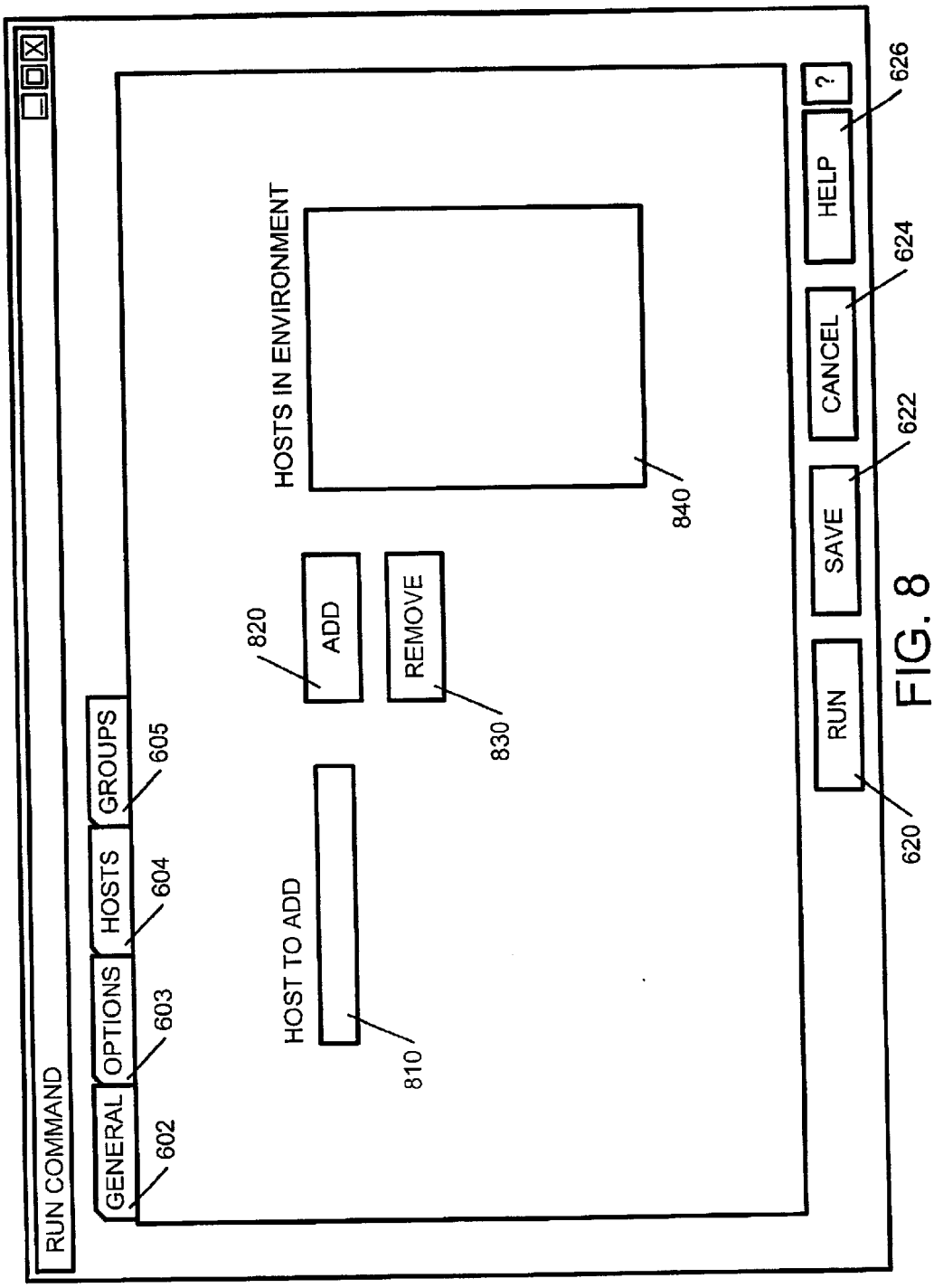
FIG. 8 illustrates a third dialog window of the common interface.

FIG. 8 displays a dialog window of the hosts tab 604 of the common interface. This dialog window lets a user add computer systems to the list of computer systems on which the command is to be executed. This dialog window is provided as a convenience to the user since the computer systems can easily be entered in box 616 of FIG. 6. The computer systems on which the command is to be executed may be added using box 810 and add button 820. The selected computer systems and the software management utility running on the systems are displayed in box 840. The software management utility information may be taken from FIG. 5. The remove button 830 is used in conjunction with box 810 to remove computer systems from the list of systems on which the command is to be executed.

Figure 9:
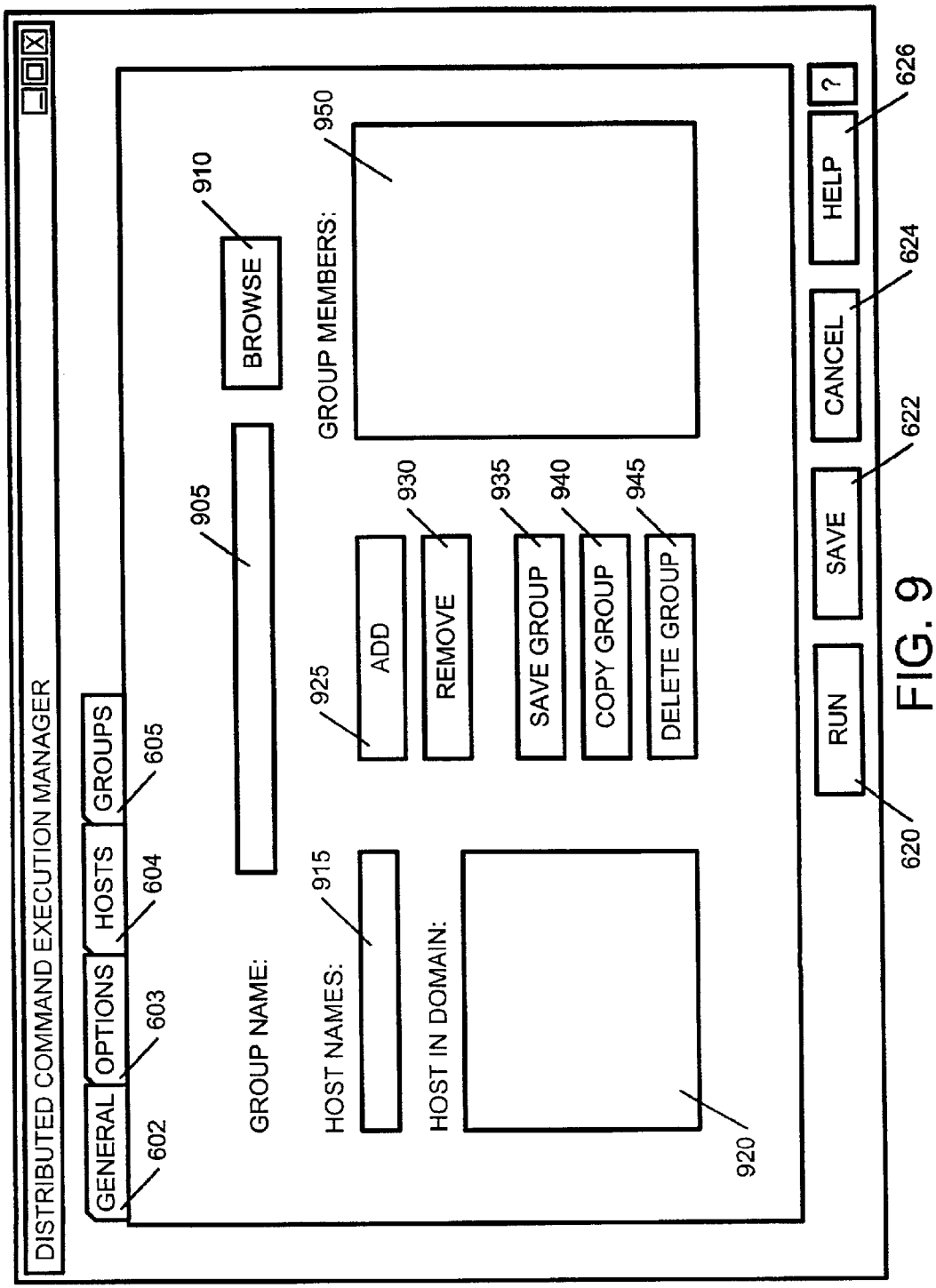
FIG. 9 illustrates a fourth dialog window of the common interface.

FIG. 9 is a dialog window of the groups tab 605 of the common interface. In this window, a user may organize the computer systems in groups. A group is formed by entering a group name in group name box 905 and by adding computer systems to the group using host names box 915 and add button 925. Any computer system may be taken out of a group by using host names box 915 and remove button 930. When a group is complete, it is saved using the save group button 935. Groups can also be formed using the copy group button 940. In this case, two or more existing groups may be combined together. An existing group may be deleted by entering the name of the group in group name box 905 and clicking on delete group box 945. Browse button 910 is used to list the names of all existing groups.

Returning to FIG. 6, when all relevant information has been entered, the command may be run using run button 620. Note that run button 620 will be disabled unless the command specification box is filled in (i.e., path window 609 and command window 610 are filled in). In addition, the run button 620 will be disabled when user window 612 and host names window 616 or groups of hosts window 618 are not filled in.

Save button 622 is used to store a command and its information (i.e., command name, directory in which stored, command script and brief description). Cancel button 624 is used to dismiss the common interface without performing any action and help button 626 is used to describe how each button and box of the different dialog windows are to be used.

Once run button 620 is clicked on, the software engine will dispatch the command using the appropriate translations to the computer systems. If TCP/IP (Transmission Control Protocol/Internet Protocol) is used, the software engine will dispatch the command to a listening port (i.e., port 80) of the systems. There, an application program will take the command to the processor or processors of the computer systems for execution. Obviously, other protocols such as the UDP (User Datagram Protocol), HTTP (Hyper Text Transfer Protocol) protocol etc. may be used as well. Thus, the invention is not limited to the TCP/IP protocol.

Execution Progress Dialog Window

Figure 10:
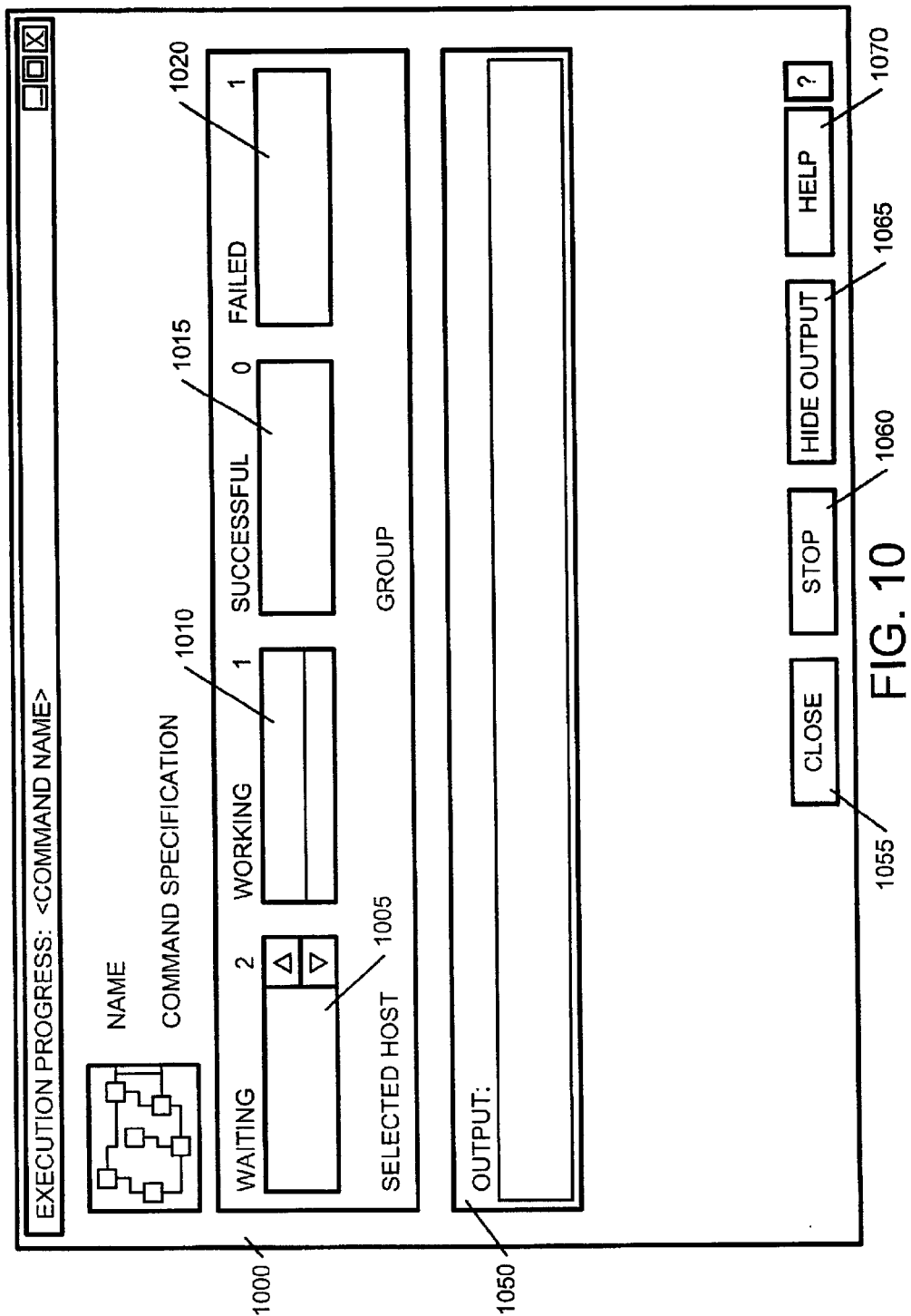
FIG. 10 depicts an execution progress dialog.

The command dispatched to the computer systems may contain another command requesting that the computer systems continually provide execution status back to the software engine. Alternatively, status requests will be periodically sent to the systems. Thus, as soon as the command is sent execution status will be provided back to the software engine. The software engine will display the status in a window. The window used, in this particular example, is an execution progress dialog window. FIG. 10 is a particular example of the execution progress dialog. The execution progress dialog is made of two parts, an execution progress window 1000 and an output display window 1050. In the execution progress window 1000, the name of the command being executed and its specification are displayed.

The execution progress window 1000 also contains a "waiting" sub-window 1005, a "working" sub-window 1010 and a "completed" sub-window 1025. The completed sub-window 1025 is further subdivided into "successful" sub-window 1015 and "failed" sub-window 1020. In the "waiting" sub-window 1005, the names and the number of all the computer systems on which the command has yet to start executing are displayed.

In the "working" sub-window 1010, the names and the number of the computer systems on which the command is being executed are displayed. When the command begins execution on a computer system, the name of the computer system is moved from the "waiting" sub-window 1005 to the "working" sub-window 1010. The number displayed in "waiting" sub-window 1005 is decreased by one and the number displayed in the "working" sub-window 1010 is increased by one.

When the command has finished executing on a computer system, the name of the computer system will be moved from the "working" sub-window 1010 to the "completed" sub-window 1025 and displayed in either the "successful" sub-window 1015, if it has been successfully completed, or the "failed" sub-window 1020 if it has not successfully completed. The number shown in working window 1010 will be decreased by one and the number in either the "successful" sub-window 1015 or the "failed" sub-window 1020 will be increased by one.

If the user highlights the name of a computer system in any one of the sub-windows, further information regarding the execution status of the command will be displayed in the output window 1050. For example, if the name of the highlighted computer system is in the "waiting" sub-window 1005, "waiting to execute" will be displayed in the output window 1050. If the name of the highlighted computer system is in the "working" sub-window 1010, the execution progress of the command will be displayed in real-time. If the name of the highlighted computer is in the "successful" window 1015, the result of the command will be displayed. For example, if the command was to list all files in a directory, then all the files found in the directory will be displayed. If, on the other hand, the execution of the command should not return a result, then "command completed successfully" will be displayed.

If the name of the computer system is in the "failed" sub-window 1020, the reason for the failure will be displayed. Note that the names of the computers in the "failed" sub-window may be displayed in red to alert the system administrator.

Figure 13:
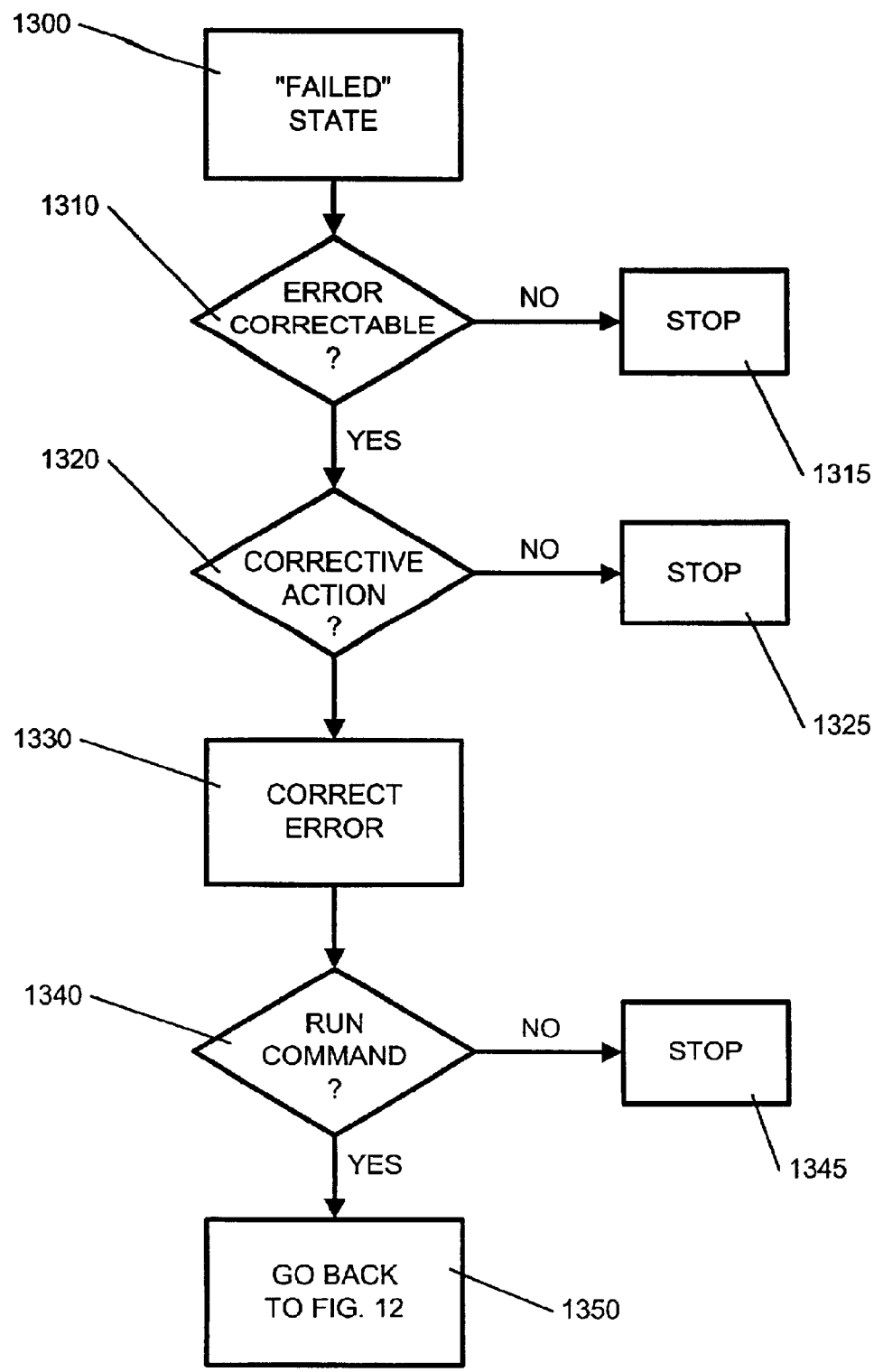
FIG. 13 is a flow diagram illustrating the corrective action procedure.

In addition to the table cross-referencing the lists of the names of the computer systems, their network addresses and the software management utilities, the software engine 400 may also have a rules table cross-referencing error messages with error types. When a computer fails to complete the execution of the command successfully, armed with the error message from the computer system in the "failed" sub-window, the software engine may access the rules table to determine the type of error responsible for the unsuccessful completion of the command. If the error is of a correctable nature, the user may be prompted as to whether corrective action should ensue. If the user elects to correct the error, the software engine will do so automatically. After the error has been corrected, the user will be prompted as to whether the command should be re-executed by the computer system. If so, the software engine will dispatch the command to the computer system. Otherwise, nothing will be done. If the error is not of a correctable nature, then only the reason for the error will be displayed. FIG. 13 is a flow diagram illustrating the corrective action procedure. The process is entered once a "failed" state is entered by one of the computer systems (step 1300). If the error that causes the failure is of a correctable nature, the process will prompt the user as to whether the error is to be corrected. If so, the error will be corrected (steps 1310, 1320 and 1330). An example of an error that is correctable is if, for instance, the command was for a new software package to be installed on the computer systems and one computer system simply did not have anymore available memory space. If the user indicates that the error should be corrected, then the software engine could send a command to allocate more memory space.

If the error is not of a correctable nature or if the error is correctable but the user does not care to fix the error, then nothing will occur (steps 1310, 1315, 1320 and 1325).

After correcting the error, the user will be prompted as to whether the command is to be re-executed by the computer system (that failed the command). If so, the command will be re-executed by the computer system as outlined in FIG. 12 below (steps 1340 and 1350). If not, the process will stop there (steps 1340 and 1345).

Returning to FIG. 10, the execution of the command on any computer system may be canceled, if the name of the computer system is highlighted while it is in the "waiting" sub-window 1005 and the stop button 1060 is selected. When this occurs, a window will pop open requesting the user to confirm the cancellation action. If the user does so confirm, the name of the computer system will be taken off the "waiting" sub-window. If the name of the highlighted computer system is instead in the "working" sub-window 1110 when the stop button 1060 is asserted, again a window will pop open requesting that the user confirm the cancellation action. If the user does so confirm, the execution of the command will be stopped and the name of the computer system will be moved to the "failed" sub-window. To stop the execution of the command, the software engine sends a stop command to that system. In this case, the reason for the failure may be displayed as "command canceled by user".

Close button 1055 is used to close the execution progress dialog window without disturbing the execution of the command on the computer systems. As its name suggests, hide output button 1065 is used to hide the output window 1050 from view. When the output window is hidden from view, the output button 1065 is changed to show output button 1065 (not shown). This is to let the user know that the button is to be selected if the output window 1050 is to be displayed. Help button 1070 provides information about every option on the execution progress window dialog.

Instead of displaying the output of the command in the execution progress dialog, a user may choose to have it presented in graphical representations such as charts, graphs etc. The output may also be saved in HTML, Poscript, XML, etc. The output may be e-mailed, for example, to the system administrator or posted on the web for easy accessibility.

Figure 11:
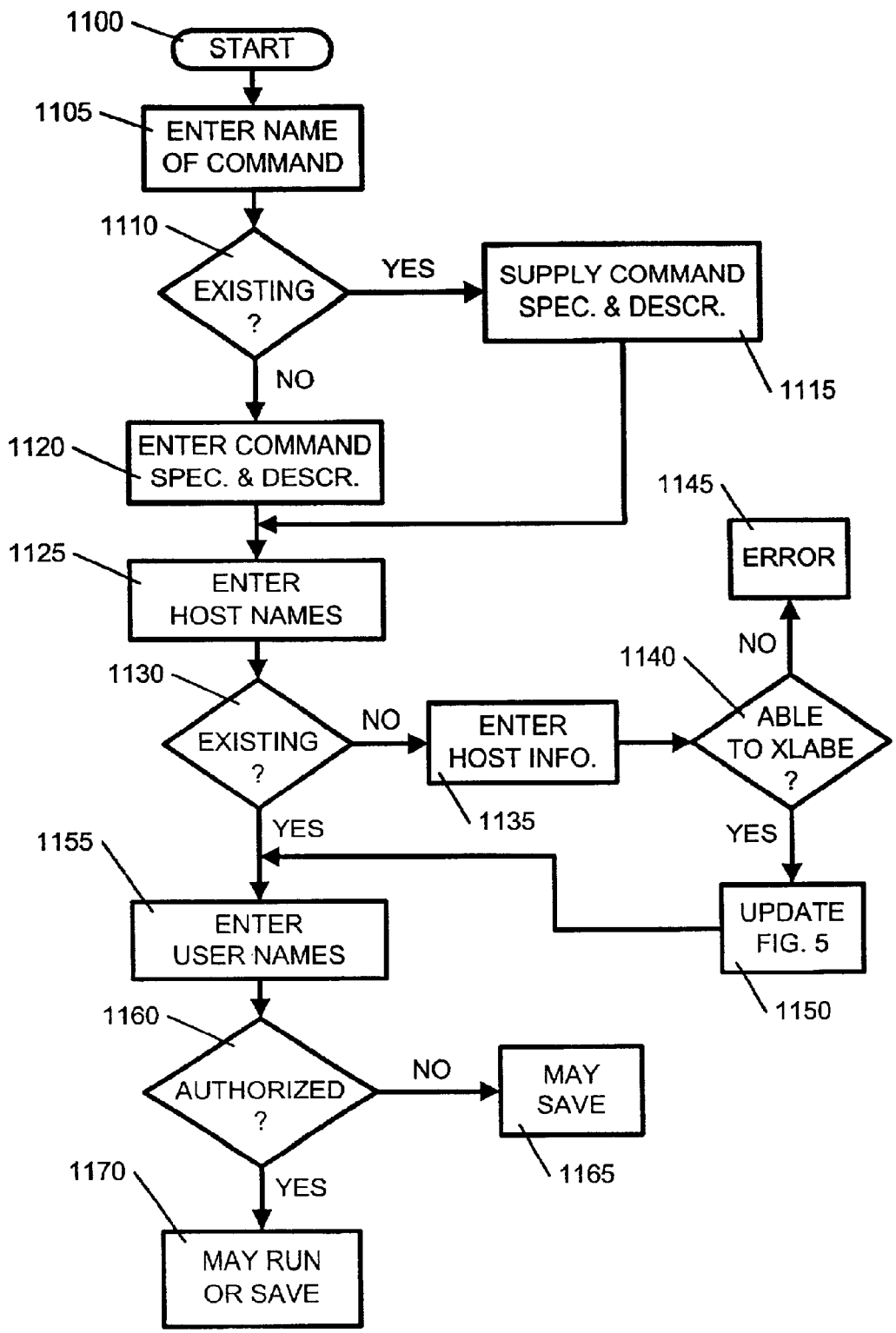
FIG. 11 depicts a flow chart of the common interface dialog window.

FIG. 11 is a flow chart of the common interface dialog window. This flow chart will be better understood when viewed in conjunction with FIG. 6. When the common interface is accessed, the process is at step 1100. At step 1105, the name of a command is entered in name box 606. If the command already exists, the directory where the command is stored, the command script and the definition of the command are provided in path box 609, command box 610 and description box 614, respectively, as soon as the cursor leaves name box 606 (steps 1110 and 1115). Note that the name of the command will exist if entered by double-clicking on a name from the list of existing commands displayed when the browse button 607 is used. If the command is not an existing command, the user needs to enter the information in the boxes (step 1120).

The name or names of the computer systems or existing group or groups of computer systems on which the command is to be executed are to be entered in hosts names box 616 or groups host names 618 (step 1125). If a computer system is not in the list in FIG. 5, the user will be prompted to supply the network address and the software management utility running on the computer system (steps 1130 and 1135). At this point, a check is made to determine whether the software engine is able to translate commands from the common interface into the software management utility in use on that computer system. If yes, FIG. 5 is updated (steps 1140 and 1150). If no, an error message is generated (steps 1140 and 1145). The error message may be "error software management running on the particular host is unknown". Note that the software management can determine whether it can translate commands by consulting the table in FIG. 5.

If all the computer systems on which the command is to be executed are in the list in FIG. 5, then the identity of the user needs to be entered in box 612 (step 1155). If the user has proper authorization to run the command on the systems, the user will be allowed to click on the run button 620 to start execution of the command (steps 1160 and 1170). If not, the user may save out of the system to secure the proper authorization (step 1165). Note again that at any time in the process, a user may save, cancel or request help by clicking on buttons 622, 624 or 626, respectively.

Figure 12:
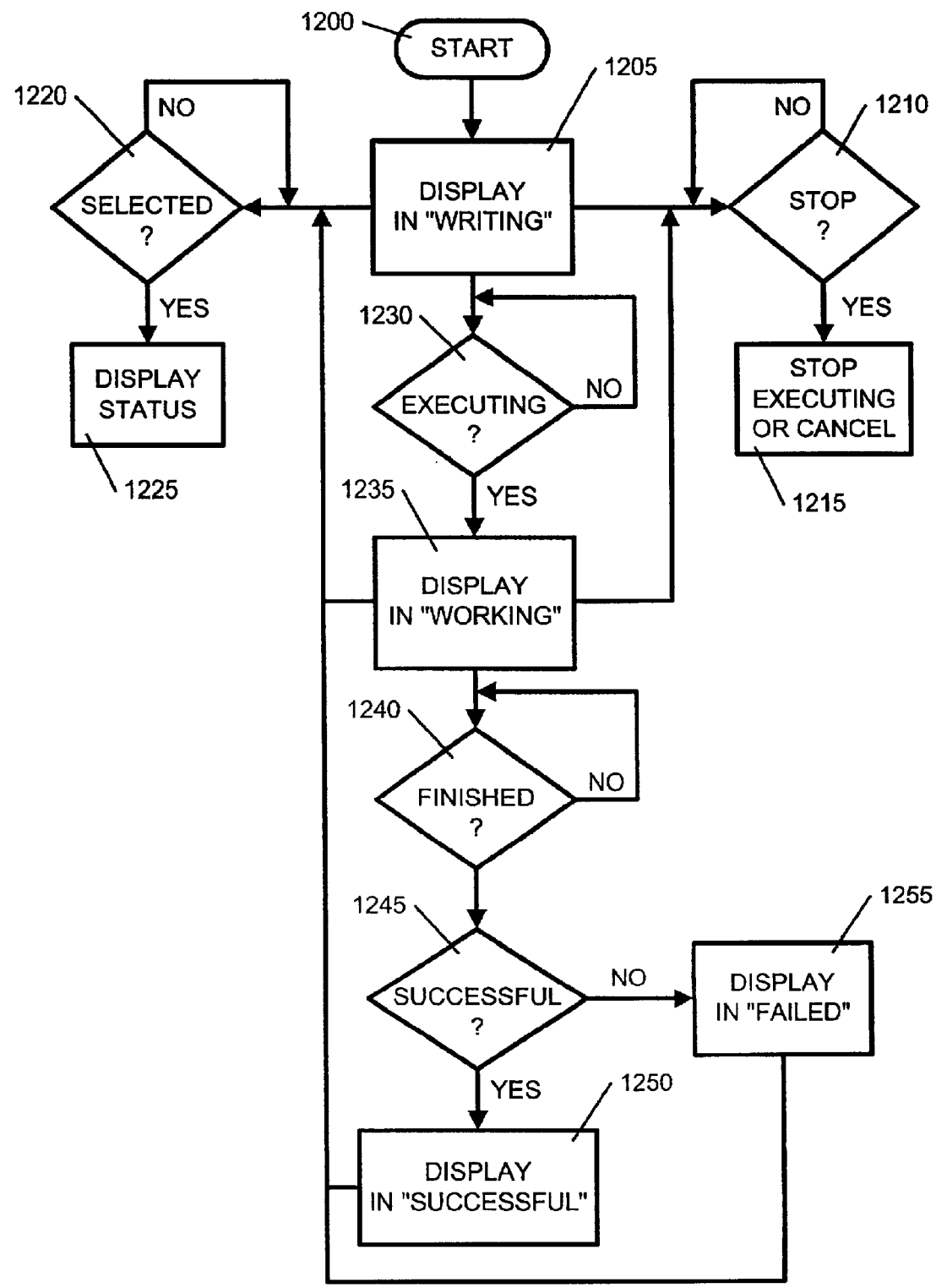
FIG. 12 is a flow diagram of the command execution progress dialog.

FIG. 12 is a flow diagram of the command execution progress dialog window. The diagram will be better understood if viewed in conjunction with FIG. 10. Further, in order not to obfuscate the invention, the process is using only one computer system. It should be understood, therefore, that the process will be traversed as many times as there are computer systems in the network running the command.

In any event, once the run button 620 in FIG. 6 is asserted, the process starts (step 1200). At step 1205, the name of the computer system is displayed in the "wait" sub-window 1005. While the name of the computer system is displayed in the "wait" sub-window, three checks are continuously being made. The first check is to determine whether the name of the computer system is selected for a command execution status display. If so, "waiting to be executed" will be displayed in output window 1050 (steps 1220 and 1225).

The second check is to determine whether to cancel the execution of the command. If so, the command execution will be canceled (steps 1210 and 1215). As stated earlier, the command execution will be canceled when the user selects the name of the computer system in the "wait" sub-window and clicks on the stop button 1060. When the stop button 1060 is asserted, the software engine in FIG. 4 sends a kill execution command to the selected computer system.

The third check is to determine whether the computer system has started executing the command. If so, the name of the computer system is moved from the "wait" sub-window to the "working" sub-window (steps 1230 and 1235).

While the computer system is displayed in the "working" sub-window, three checks are again continuously made. The first check is to determine whether the computer system has been selected to provide execution status. If so, the software engine sends a request to the computer system to provide real-time progress of the execution of the command. The progress is displayed in the output window 1050 (steps 1220 and 1225).

The second check is made to determine whether the execution of the command is to be stopped. If so, the software engine sends a kill execution command to the computer system (steps 1210 and 1215).

The third check is made to determine whether the command has finished executing on the computer system. If so, another check is made to determine whether the execution was successful. If yes, the name of the computer system is moved from the "working" sub-window to the "successful" sub-window (steps 1240, 1245 and 1250). If the execution is not successfully completed, the name of the computer system is instead moved to the "failed" sub-window (steps 1240, 1245 and 1255).

While the name of the computer system is in either the "successful" or the "failed" sub-window, a check is continuously made to determine whether command execution status is to be provided. If so, and if the computer system is in the "successful" sub-window, either the result of the command or a "command successfully completed" is displayed in the output window 1050 (steps 1220 and 1225). If the computer system is instead displayed in the "failed" sub-window, the software engine will send a request to the computer system to provide the reason why the execution of the command failed. The reason is then displayed in the output window 1050 (steps 1220 and 1225).

As mentioned above, the user may then be prompted to have the error automatically corrected by the invention if the error is of a correctable nature. If the user so elects, the invention will correct the error and prompt the user to run the command again (see FIG. 13).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of executing system management commands on computer systems in a network, said computer systems running different system management software utilities having different command structures, said method comprising the steps of:
   entering the commands in a common interface, the commands including requests to start execution of the commands, to stop execution of the commands and to provide command execution progress status to the common interface, said common interface translating said commands into the different command structures;
   dispatching each translated command to an appropriate computer system; and
   executing the dispatched command.

2. The method of claim 1 wherein all dispatched commands are executed concurrently.

3. The method of claim 1 wherein the requests to stop execution and to provide command execution progress status are directed to one, a few or all the computer systems executing the commands.

4. The method of claim 3 wherein the computer systems on which the commands are to be executed are entered in groups.

5. The method of claim 4 wherein before a command in dispatched to a computer system, the command interface pings the computer system to ascertain its operability.

6. A computer program product in a computer readable medium for executing system management commands on computer systems in a network, said computer systems running different system management software utilities having different command structures, said computer program product comprising:
   code means for allowing the commands to be entered in a common interface, the commands including requests to start execution of the commands, to stop execution of the commands and to provide command execution progress status, said common interface translating said commands into the different command structures;
   code means for dispatching each translated command to an appropriate computer system; and
   code means for requesting that the dispatched command be executed.

7. The computer program product of claim 6 wherein all dispatched commands are executed concurrently.

8. The computer program product of claim 6 wherein the requests to stop execution and to provide command execution progress status are directed to one, a few or all the computer systems executing the command.

9. The computer program product of claim 8 wherein the computer systems on which the commands are to be executed are entered in groups.

10. The computer program product of claim 9 wherein before a command is dispatched to a computer system, the command interface pings the computer system to ascertain its operability.

11. An apparatus for executing a system management commands on computer systems in a network, said computer systems running different system management software utilities having different command structures, said apparatus comprising:
   means for entering the commands in a common interface, the commands including requests to start execution of the commands, to stop execution of the commands and to provide command execution progress status to the common interface, said common interface translating said commands into the different command structures;
   means for dispatching each translated command to an appropriate computer system; and
   means for requesting that the dispatched command be executed.

12. The apparatus of claim 11 wherein all dispatched commands are executed concurrently.

13. The apparatus of claim 11 wherein the requests to stop execution and to provide command execution progress status are directed to one, a few or all the computer systems executing the commands.

14. The apparatus of claim 13 wherein the computer systems on which the commands are to be executed are entered in groups.

15. The apparatus of claim 14 wherein before a command is dispatched to a computer system the command interface pings the computer system to ascertain its operability.

16. A computer system for commanding that system management commands be executed on computer systems in a network, said computer systems running different system management software utilities having different command structures, said computer system comprising:

at least one memory device for storing the commands; and at least one processor, said processor for processing software code for allowing the commands to be entered in a common interface, the commands including requests to start execution of the commands, to stop execution of the commands or to provide command execution progress status, and for translating said commands into the different command structures, for dispatching each translated command to an appropriate computer system and for commanding that said dispatched command be executed.

17. The computer system of claim 16 wherein said all dispatched commands are executed concurrently.

18. The computer system of claim 16 wherein the requests to stop execution and to provide command execution progress status are directed to one, a few or all the computer systems executing the commands.

19. The computer system of claim 18 wherein the computer systems on which the commands are to be executed are entered in groups.

20. The computer system of claim 19 wherein before a command is dispatched to a computer system, the command interface pings the computer system to ascertain its operability.

* * * * *